US007689422B2

(12) United States Patent
Eves et al.

(10) Patent No.: US 7,689,422 B2
(45) Date of Patent: Mar. 30, 2010

(54) METHOD AND SYSTEM TO MARK AN AUDIO SIGNAL WITH METADATA

(75) Inventors: David A. Eves, Crawley (GB); Richard S. Cole, Redhill (GB); Christopher Thorne, East Croydon (GB)

(73) Assignee: AMBX UK Limited, Surrey (GB)

( * ) Notice: Subject to any disclaimer, the term of this patent is extended or adjusted under 35 U.S.C. 154(b) by 690 days.

(21) Appl. No.: 10/540,312

(22) PCT Filed: Dec. 10, 2003

(86) PCT No.: PCT/IB03/06019

§ 371 (c)(1), (2), (4) Date: Jun. 21, 2005

(87) PCT Pub. No.: WO2004/059615

PCT Pub. Date: Jul. 15, 2004

(65) Prior Publication Data

US 2006/0100882 A1 May 11, 2006

(30) Foreign Application Priority Data

Dec. 24, 2002 (GB) ................................ 0230097.8
Sep. 3, 2003 (GB) ................................ 0320578.8

(51) Int. Cl.
*G10L 11/00* (2006.01)
*G10L 15/00* (2006.01)
*G10L 15/04* (2006.01)
*G10L 21/00* (2006.01)

(52) U.S. Cl. ........................ 704/270; 704/231; 704/251

(58) Field of Classification Search ................ 704/231, 704/251, 270
See application file for complete search history.

(56) References Cited

U.S. PATENT DOCUMENTS 5,038,658 A 8/1991 Tsuruta et al.

(Continued)

FOREIGN PATENT DOCUMENTS

EP 1100073 A2 5/2001

(Continued)

OTHER PUBLICATIONS

Modgi T: Structured Description Method for General Acoustic Signals Using XML Format, IEEE Aug. 2001, pp. 725-728, XP010661941.

(Continued)

*Primary Examiner*—Richemond Dorvil
*Assistant Examiner*—Eric Yen
(74) *Attorney, Agent, or Firm*—Burns & Levinson LLP; Bruce D. Jobse

(57) ABSTRACT

A method of processing an audio signal comprises receiving an audio signal, extracting features from the audio signal, and translating the extracted features into metadata. The metadata comprises an instruction set of a markup language. A system for processing the audio signal is also disclosed, which comprises an input device for receiving the audio signal and a processor for extracting the features from the audio signal and for translating the extracted features into the metadata.

5 Claims, 3 Drawing Sheets

U.S. PATENT DOCUMENTS

Figure 1:
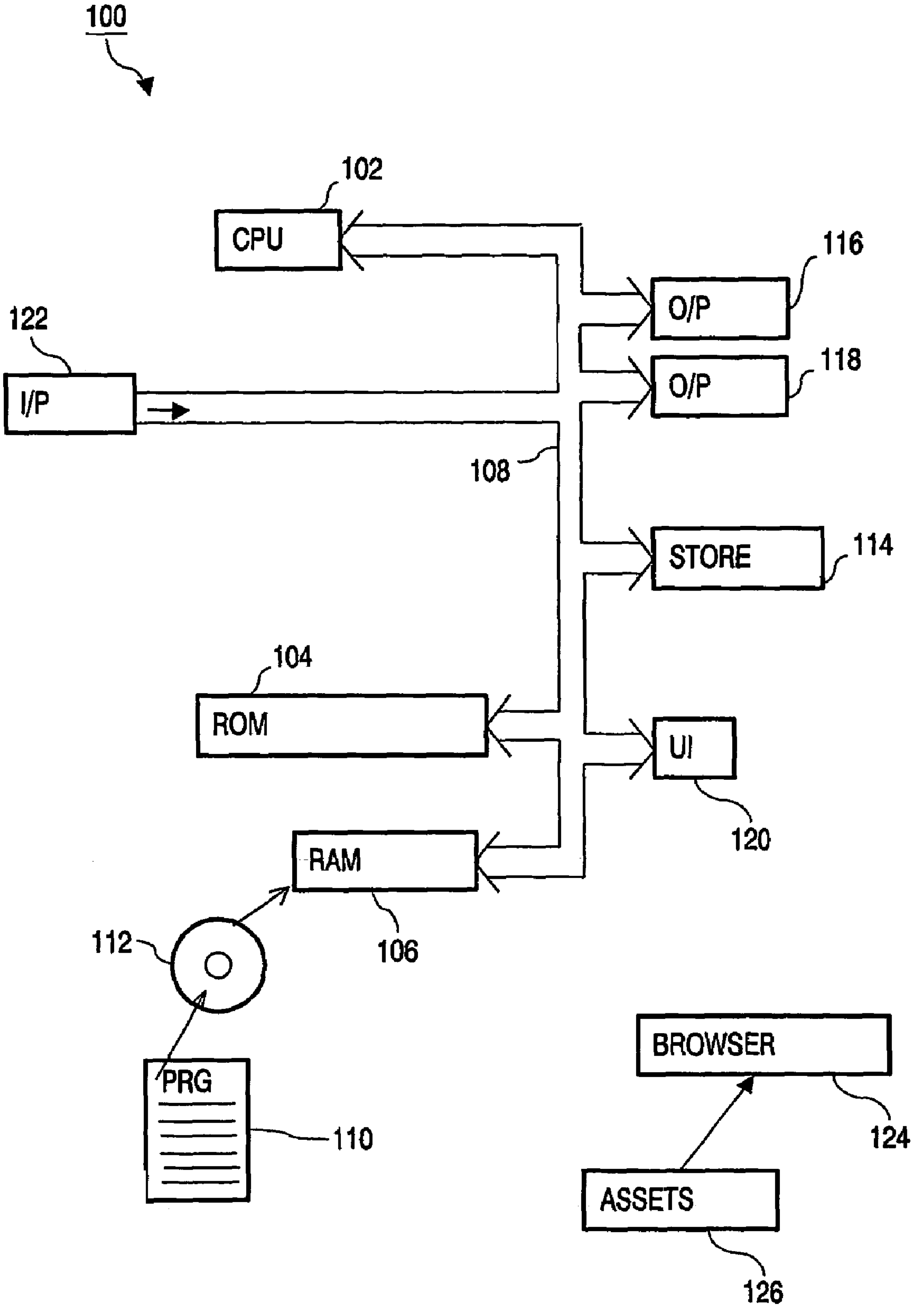

| | | | | |
|---|---|---|---|---|
| 5,960,447 A * | 9/1999 | Holt et al. | 715/201 |
| 6,308,154 B1 * | 10/2001 | Williams et al. | 704/254 |
| 6,505,160 B1 * | 1/2003 | Levy et al. | 704/270 |
| 6,651,253 B2 * | 11/2003 | Dudkiewicz et al. | 725/114 |
| 6,973,665 B2 * | 12/2005 | Dudkiewicz et al. | 725/46 |
| 7,209,571 B2 * | 4/2007 | Davis et al. | 382/100 |
| 7,548,565 B2 * | 6/2009 | Sull et al. | 370/503 |
| 2002/0016817 A1 | 2/2002 | Offer | |
| 2002/0069218 A1 * | 6/2002 | Sull et al. | 707/501.1 |
| 2002/0169012 A1 | 11/2002 | Eves et al. | |
| 2002/0198994 A1 * | 12/2002 | Patton et al. | 709/225 |
| 2003/0177503 A1 * | 9/2003 | Sull et al. | 725/112 |

FOREIGN PATENT DOCUMENTS

| | | |
|---|---|---|
| EP | 1260968 A1 | 11/2002 |
| EP | 1260968 B1 | 11/2002 |
| GB | 2361096 A | 10/2001 |

OTHER PUBLICATIONS

S. Quackenbush, et al: Overview of MPEG-7 Audio, IEEE vol. 11, No. 6, Jun. 2001, pp. 725-729, XP001059867.

Adam T. Lindsay, et. al: Representation and Linking Mechanisms for Audio in MPEG-7, vol. 16, No. 1-2, Sep. 2000, pp. 193-209, XP004216276 .

Music Markup Language: Jun. 2003.

Holgar Crysand, et al.: MPEG-7 Encoding and Processing: MPEG7 AUDIOENC+MPEG7 AUDIOB, Mar. 2004, pp. 1-7, XP002274199.

Mayhem, et al: MusicBrainz Metadata Intiative 2.1, Jun. 2003.

Music and Lyrics Markup Language 4ML, Jun. 2003.

Perry Roland: Extensible Markup Language for Music Information Retrieval, XML4MIR, 2000.

Music-Related XML Vocabularies Designed to Express Everything From Musical Scores to Basic Notion to Synthesis Digrams and More, 2000.

Matt Welsh et al: Querying Large Collections of Music for Similarity, Nov. 1999, pp. 1-13.

* cited by examiner

METHOD AND SYSTEM TO MARK AN AUDIO SIGNAL WITH METADATA

The present invention relates to a method and system for processing an audio signal in accordance with extracted features of the audio signal. The present invention has particular, but not exclusive, application with systems that determine and extract musical features of an audio signal such as tempo and key. The extracted features are translated into metadata.

Ambient environment systems that control the environment are known from, for example, our United States patent application publication U.S. 2002/0169817, which discloses a real-world representation system that comprises a set of devices, each device being arranged to provide one or more real-world parameters, for example audio and visual characteristics. At least one of the devices is arranged to receive a real-world description in the form of an instruction set of a markup language and the devices are operated according to the description. General terms expressed in the language are interpreted by either a local server or a distributed browser to operate the devices to render the real-world experience to the user.

United States patent application publication U.S. 2002/0169012 discloses a method of operating a set of devices that comprises receiving a signal, for example at least part of a game world model from a computer program. The signal is analysed to produce a real-world description in the form of an instruction set of a markup language and the set of devices is, operated according to the description.

It is desirable to provide a method of automatically generating instruction sets of the markup language from an audio signal.

According to a first aspect of the present invention there is provided a method of processing an audio signal comprising receiving an audio signal, extracting features from the audio signal, and translating the extracted features into metadata, the metadata comprising an instruction set of a markup language.

According to a second aspect of the present invention there is provided a system for processing an audio signal, comprising an input device for receiving an audio signal and a processor for extracting features from the audio signal and for translating the extracted features into metadata, the metadata comprising an instruction set of a markup language.

Owing to the invention, it is possible to generate automatically from an audio signal metadata that is based upon the content of the audio signal, and can be used to control an ambient environment system.

The method advantageously further comprises storing the metadata. This allows the user the option of reusing the metadata that has been outputted, for example by transmitting it to a location that does not have the processing power to execute the feature extraction from the audio signal. Preferably, the storing comprises storing the metadata with associated time data, the time data defining the start time and the duration, relative to the received audio signal, of each markup language term in the instruction set. By storing time data with the metadata that is synchronised to the original audio signal the metadata, when reused with the audio signal, defines an experience that is time dependent, but that also matches the original audio signal.

Advantageously, the method further comprises transmitting the instruction set to a browser, and also further comprising receiving markup language assets. Preferably the method also further comprises rendering the markup language assets in synchronisation with the received audio signal. In this way, the metadata is used directly for providing the ambient environment. The browser receives the instruction set and the markup language assets and renders the assets in synchronisation with the outputted audio, as directed by the instruction set.

The features extracted from the audio signal, in a preferred embodiment, include one or more of tempo, key and volume. These features define a broad sense, aspects of the audio signal. They indicate such things as mood, which can then be used to define metadata that will determine the ambient environment to augment the audio signal.

Figure 2:
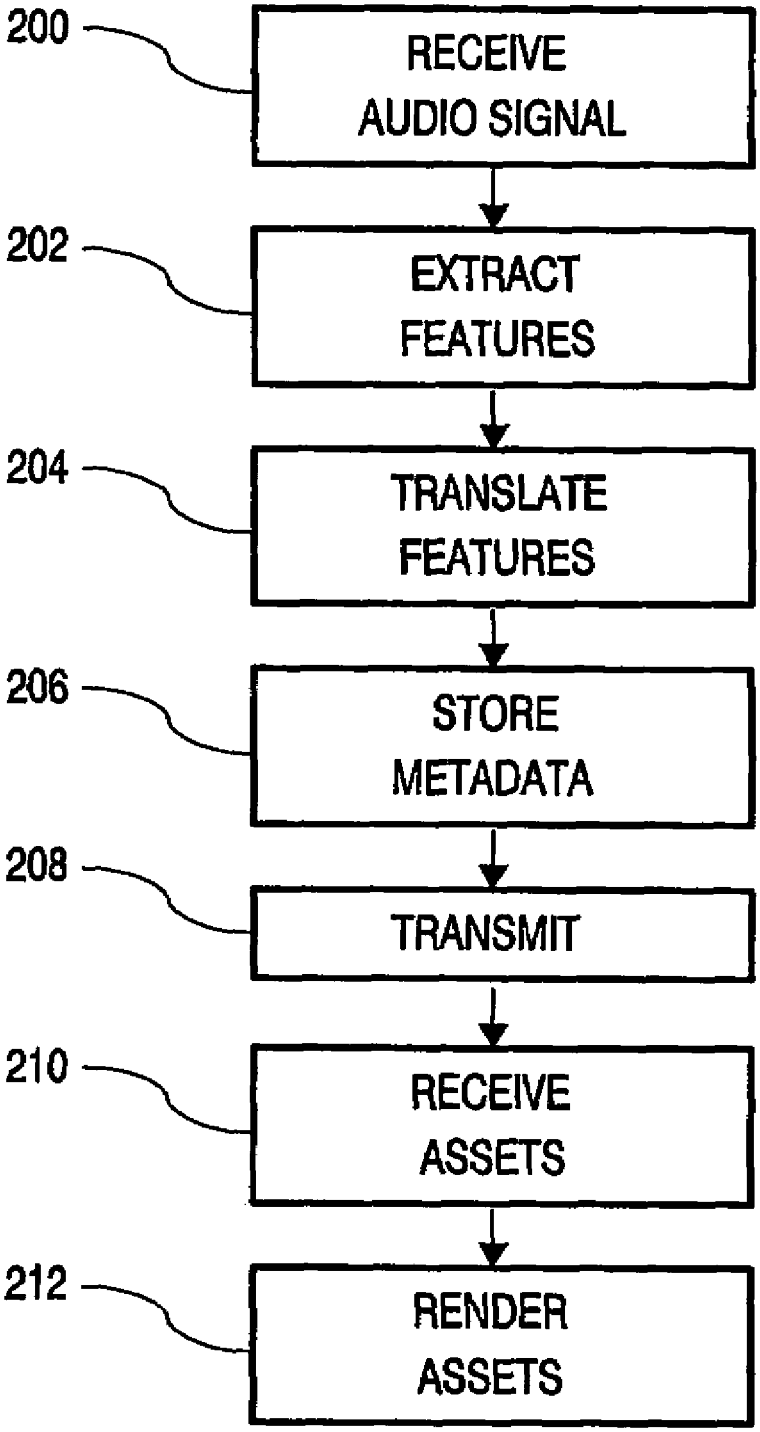
Figure 3:
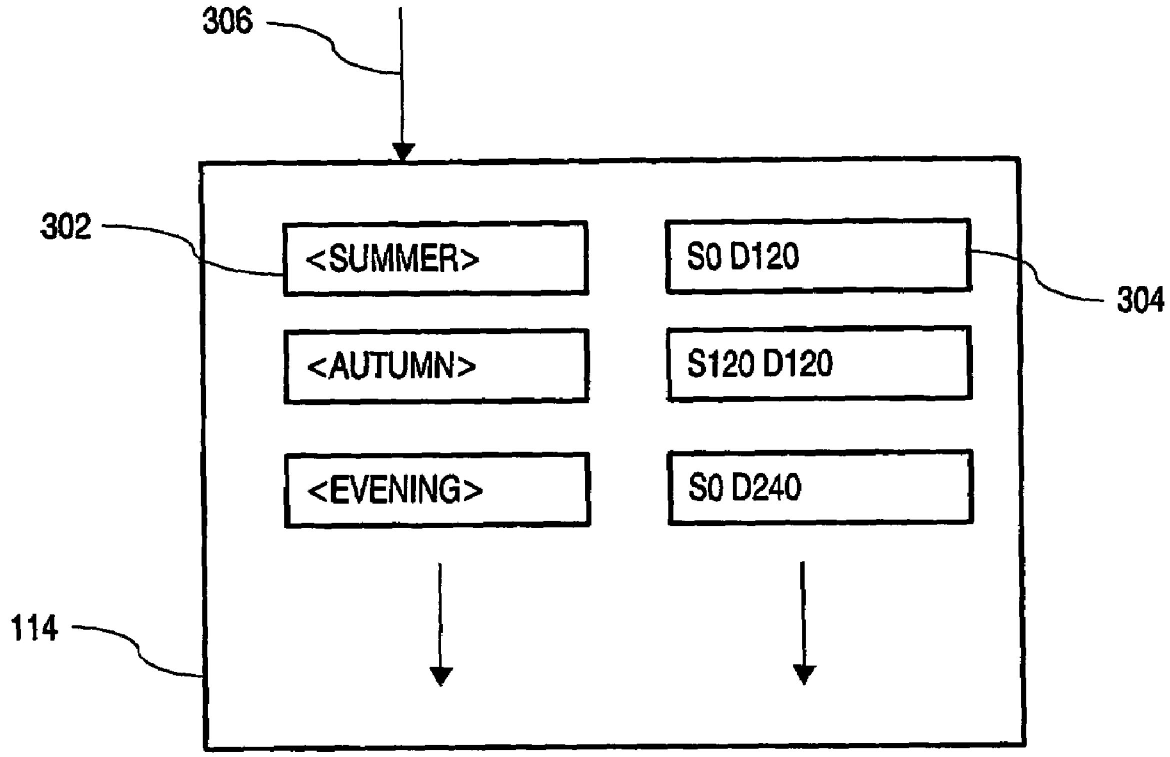

The present invention will now be described, by way of example only, and with reference to the accompanying drawings in which:

FIG. 1 is a schematic representation of a system for processing an audio signal, FIG. 2 is a flow chart of a method of processing an audio signal, and FIG. 3 is a schematic representation of storing metadata with associated time data.

FIG. 1 shows a schematic representation of a system 100 for processing an audio signal. The system 100 consists of a processor (CPU) 102 connected to memory (ROM) 104 and memory (RAM) 106 via a general is data-bus 108. Computer code or software 110 on a carrier 112 may be loaded into the RAM 106 (or alternatively provided in the ROM 104), the code causing the processor 102 to perform instructions embodying the processing method. Additionally, the processor 102 is connected to a store 114, to output devices 116, 118, and to an input device 122. A user interface (UI) 120 is also provided.

The system 100 may be embodied as a conventional home personal computer (PC) with the output device 116 taking the form of a computer monitor or display. The store 114 may be a remote database available over a network connection. Alternatively, if the system 100 is embodied in a home network, the output devices 116, 118 may be distributed around the home and comprise, for example, a wall mounted flat panel display, computer controlled home lighting units, and/or audio speakers. The connections between the processor 102 and the output devices 116, 118 may be wireless (for example communications via radio standards WiFi or Bluetooth) and/or wired (for example communications via wired standards Ethernet, USB).

The system 100 receives an input of an audio signal (such as a music track from a CD) from which musical features are extracted. In this embodiment, the audio signal is provided via an internal input device 122 of the PC such as a CD/DVD or hard disc drive. Alternatively, the audio signal may be received via a connection to a networked home entertainment system (Hi-Fi, home cinema etc). Those skilled in the art will realise that the exact hardware/software configuration and mechanism of provision of an audio signal is not important, rather that such signals are made available to the system 100.

The extraction of musical features from an audio signal is described in the paper "Querying large collections of music for similarity" (Matt Welsh et al, UC Berkeley Technical Report UCB/CSD-00-1096 November 1999. The paper describes how features such as an average tempo, volume, noise, and tonal transitions can be determined from analysing an input audio signal. A method for determining the musical key of an audio signal is described in the U.S. Pat. No. 5,038,658.

The input device 122 is for receiving the audio signal and the processor 102 is for extracting features from the audio signal and for translating the extracted features into metadata, the metadata comprising an instruction set of a markup language. The processor 102 receives the audio signal and extracts musical features such as volume, tempo, and key as described in the aforementioned references. Once the processor 102 has extracted the musical features from the audio signal, the processor 102 translates those musical features into metadata. This metadata will be in the form of very broad expressions such as <SUMMER> or <DREAMY POND>. The translation engine within the processor 102 operates either a defined series of algorithms to generate the metadata or is in the form of a "neural network" arrangement to produce the metadata from the extracted features. The resulting metadata is in the form of an instruction set of a markup language.

The system 100 further comprises a browser 124 (shown schematically in FIG. 2) that is distributed amongst a set of devices, the browser 124 being arranged to receive the instruction set of the markup language and to receive markup language assets and to control the set of devices accordingly. The set of devices that are being controlled by the browser 124 may include the output devices 116 and 118, and/or may include further devices remote from the system. Together these devices make up an ambient environment system, the various output devices 116, 118 being compliant with a markup language and instruction set designed to deliver real world experiences.

An example of such a language is physical markup language (PML), described in the Applicants co-pending applications referred to above. PML includes a means to author, communicate and render experiences to an end user so that the end user experiences a certain level of immersion within a real physical space. For example, PML enabled consumer devices such as an audio system and lighting system can receive instructions from a host network device (which instructions may be embedded within a DVD video stream for example) that causes the lights or sound output from the devices to be modified. Hence a dark scene in a movie causes the lights in the consumer's home to darken appropriately.

PML is in general a high level descriptive mark-up language, which may be realised in XML with descriptors that relate to real world events, for example, <FOREST>. Hence, PML enables devices around the home to augment an experience for a consumer in a standardised fashion.

Therefore the browser 124 receives the instruction set, which may include, for example, <SUMMER> and <EVENING>. The browser also receives markup language assets 126, which will be at least one asset for each member of the instruction set. So for <SUMMER> there may be a video file containing a still image and also a file containing colour definition. For <EVENING> there may be similarly files containing data for colour, still image and/or moving video. As the original music is played (or replayed), the browser 124 renders the associated markup language assets 126, so that the colours and images are rendered by each device, according to the capability of each device in the set.

FIG. 2 summarises the method of processing the audio signal, which comprises receiving 200 an audio signal, extracting 202 features from the audio signal, and translating 204 the extracted features into metadata, the metadata comprising an instruction set of a markup language. The audio signal is received from a CD, via the input device 122 of FIG. 1. The steps of extracting 202 the musical features of the audio signal and translating 204 the features into the appropriate metadata are carried out within the processor 102 of the system of FIG. 1. The output of the feature extraction 202 is a meta-description about the received audio signal. The structure of the meta-description will depend upon the nature of the extraction system being used by the processor 102. A relatively simple extraction system will return a description such as Key: A minor; Mean volume: 8/10; Standard deviation of volume: +/−2. A more complicated system would be able to return extremely detailed information about the audio signal including changes of the features over time within the piece of music that is being processed.

The method can further comprise the step 206 of storing the metadata. This is illustrated in FIG. 3. The storing can comprise storing the metadata 302 with associated time data 304. In the situation where an advanced feature extraction system is used at step 202, which returns data that is time dependent, the metadata that is output from the translator can also be time dependent.

For example, there may be a defined change of mood in the piece of music that makes up the audio signal. The translator may represent this with the terms <SUMMER> and <AUTUMN>, with a defined point when <SUMMER> end in the music and <AUTUMN> begins. The time data 146 that is stored can define the start time and the duration, relative to the received audio signal, of each markup language term in the instruction set. In the example used in FIG. 3, the term <SUMMER> is shown to have a start time (S) of 0, referring to the time in seconds after the start of the piece of music and a duration (D) of 120 seconds. The other two terms shown have different start and duration times as defined by the translator. In FIG. 3, the arrow 306 shows the output from the translator.

The method can further comprise transmitting 208 the instruction set to the browser 124. As discussed relative to the system of FIG. 1, the browser 124 can also receive (step 210) markup language assets 126. The browser 124 is arranged to render (step 212) the markup language assets 126 in synchronisation with the received audio signal.

The invention claimed is:

1. A method of processing an audio signal comprising acts of:

receiving an audio signal, extracting musical features from the audio signal, translating the extracted musical features into metadata, the metadata comprising an instruction set of a markup language, transmitting the instruction set to a browser, storing the metadata with associated time data, the time data defining a start time and a duration, relative to the audio signal, of each of a plurality of markup language terms of the instruction set, the time data synchronizing the metadata to the received audio signal, receiving markup language assets, and rendering the markup language assets in synchronization with the received audio signal, the synchronization matching the metadata to the received audio signal.

2. The method according to claim 1, wherein the musical features extracted from the audio signal include one or more of tempo, key and volume.

3. A system for processing an audio signal, comprising:

an input device for receiving an audio signal;

a processor for extracting musical features from the audio signal and for translating the extracted musical features into metadata, the metadata comprising an instruction set of a markup language;

a memory operably coupled to the processor for storing the metadata with time data, the time data defining a start time and a duration, relative to the audio signal, of each of a plurality of markup language terms of the instruction set, the time data enabling synchronizing the metadata to the received audio signal, an output device for outputting the received audio signal; and a browser distributed amongst a set of devices, the browser arranged to receive an instruction set of the markup language and markup language assets and to control the set of devices, thereby rendering the markup language assets in synchronization with the received audio signal.

4. The system according to claim 3, further comprising an output device for outputting the received audio signal.

5. A method of processing an audio signal comprising acts of:

receiving an audio signal, extracting musical features from a plurality of portions of the audio signal, translating the extracted musical features from the plurality of portions into corresponding metadata, the metadata comprising an instruction set of a markup language corresponding to real world descriptions, storing in memory the metadata corresponding to each of the plurality of audio signal portions;

storing time data in memory in association with each of a plurality of markup language terms of the instruction set, the time data comprising a start time and a duration relative to a corresponding portion of the audio signal, receiving markup language assets, and rendering markup language assets as identified by the metadata terms in synchronization with the plurality of corresponding portions of the received audio signal.

* * * * *